H. C. LYONS.
LIQUID DISPENSER.
APPLICATION FILED JUNE 11, 1915.
1,181,783.
Patented May 2, 1916.
2 SHEETS—SHEET 1.
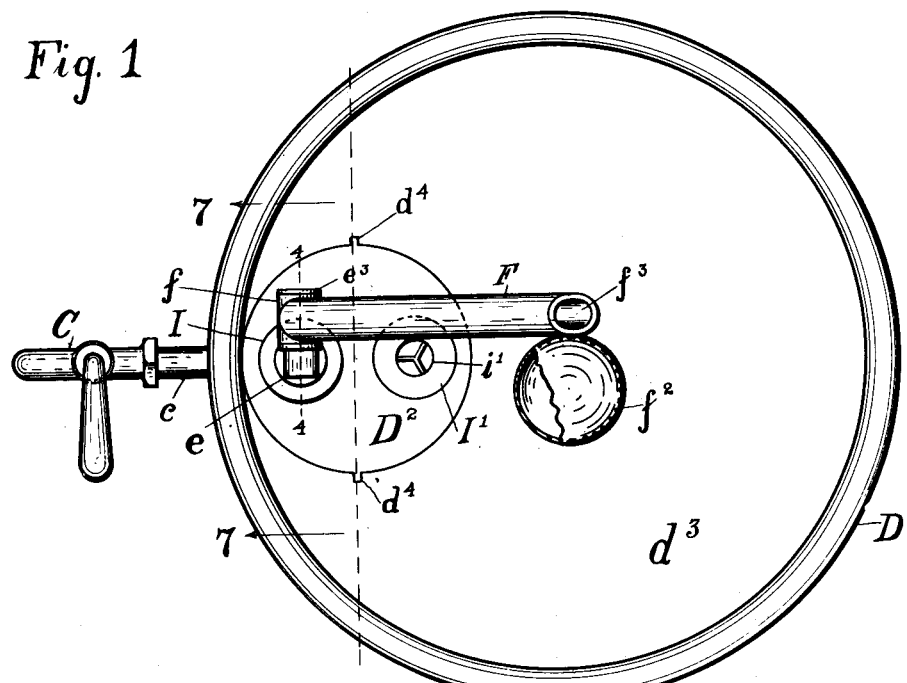
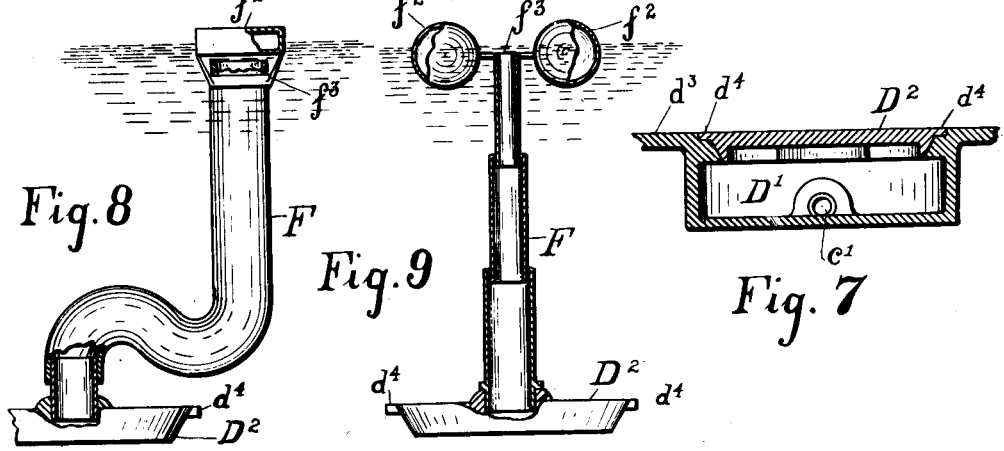
WITNESSES:
INVENTOR
Harry C. Lyons
BY
Geo. Wm. Hiatt
ATTORNEY

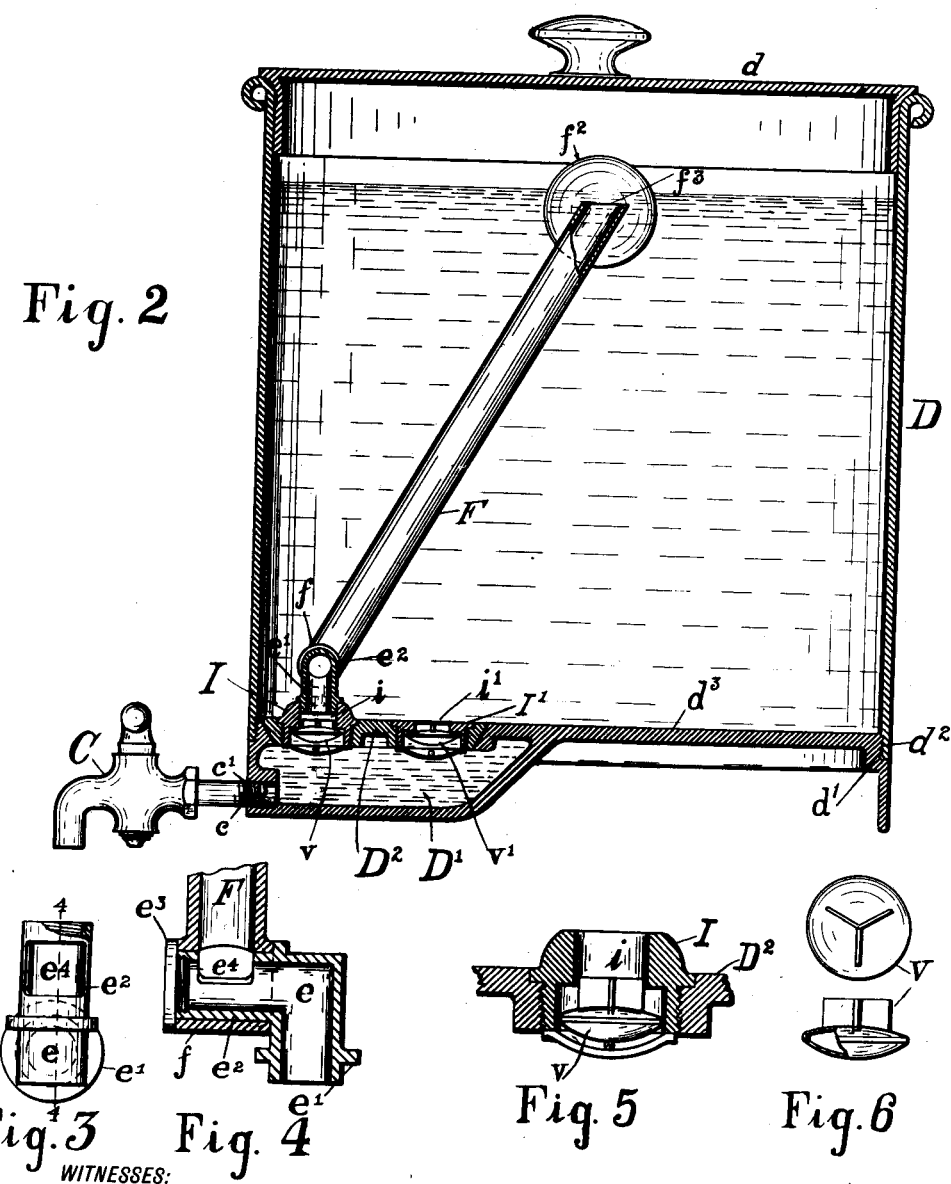

UNITED STATES PATENT OFFICE.

HARRY C. LYONS, OF NEW YORK, N. Y.

LIQUID-DISPENSER.

1,181,783.

Specification of Letters Patent.

Patented May 2, 1916.

Application filed June 11, 1915. Serial No. 33,617.

*To all whom it may concern:*

Be it known that I, HARRY C. LYONS, a citizen of the United States, and a resident of the borough of Manhattan, city, county, and State of New York, have invented certain new and useful Improvements in Liquid-Dispensers, of which the following is a specification.

My invention relates to means for dispensing liquids containing constituents of different specific gravities, as set forth in Letters Patent No. 1,139,129, issued to me May 11, 1915, whereby a relatively proportionate discharge of each is attained simultaneously,—the method and apparatus, while not necessarily limited thereto, being particularly adapted to the equitable dispensing of milk in such manner as to insure the delivery of a due apportionment of cream and the richer and lighter portions of the milk with the thinner and heavier portions thereof.

The object of the present improvements is mainly to simplify and cheapen the apparatus used for the purpose, and the invention consists in the specific construction and arrangement of parts described and claimed herein, a distinctive feature being the use of a floatable drain duct for the cream or lighter constituents of the liquid communicating with a mixing and discharge chamber which is also provided with an inlet duct for the lower and heavier constituents of the liquid as hereinafter more fully set forth.

In the accompanying drawings, Figure 1, is a top view of my improved dispenser, with the cover removed; Fig. 2, is a central vertical sectional elevation thereof; Fig. 3, a top view, partly broken away, of the tubular fulcrum-elbow for connecting the floatable drain duct with its inlet into the mixing and discharge chamber; Fig. 4, is a sectional elevation taken upon plane of line 4—4 Figs. 1, and 3, showing the lower end of the floatable drain-duct in position on said fulcrum elbow; Fig. 5, is a sectional detail of the inlet and valve for the floatable drain duct; Fig. 6, details of one and each of the float valves; Fig. 7, a sectional detail taken upon plane of line 7—7, Fig. 1; Figs. 8, and 9, illustrate diagrammatically modifications in the form and construction of the floating drain duct.

D, represents my dispensing receptacle or reservoir, preferably although not necessarily of cylindrical shape in horizontal cross section, and this reservoir D, may be inclosed in a larger receptacle or casing as shown in my Letters Patent hereinbefore referred to,—such casing being of sufficient size and capacity to contain a packing of ice if required,—it being understood that I herein describe my apparatus as adapted to the storage and dispensing of milk, without limiting myself to this specific purpose, to which however it is well adapted. The dispensing reservoir D, is, as heretofore, provided with a removable cover $d$, and is otherwise adapted to meet the requirements of use.

The lower part of the dispensing reservoir is formed with a mixing chamber D', which is preferably detachable to facilitate cleansing of parts. Thus, the dispensing reservoir D, being cylindrical the base in which the mixing chamber D', is formed may be circular also and provided with a peripheral screw thread $d'$, for engagement with a female screw thread $d^2$, formed for its reception on the lower inner edge of the receptacle D, as shown in Fig. 1.

The mixing and discharge chamber D', is connected with a dispensing cock C, by means of a pipe $c$, attached to the said faucet and formed at its inner end with a screw thread $c'$, which engages with a female thread formed for it in the wall of said mixing chamber as indicated in Fig. 1.

In the top of the mixing chamber D', are situated two inlet ports, closed normally by float valves $v$, $v'$. The inlets and seats for said valves are preferably formed in screw plugs I, I', inserted in a detachable disk D², constituting a valve plate and forming part of the floor $d^3$, of the dispensing receptacle D, as will be seen by reference more particularly to Figs. 1, 2, and 7. The edges of this removable valve plate D², are preferably beveled to fit snugly in the correspondingly beveled seat prepared for them in the base plate or floor $d^3$, of the reservoir D,— and when the valve plate is of circular form as shown in the drawings, it may be formed with radial lugs $d^4$, fitting in recesses formed for them in the floor $d^3$ of the reservoir, as shown in Figs. 1, and 7, thereby insuring the correct alinement of the valves, &c., as related to the discharge pipe $c'$, as in Fig. 2. Obviously the valve plate $D^2$, may be made of any desired peripheral configuration, and the floor $d^3$, formed with a correspondingly shaped seat for its reception and support. This detachable valve plate $D^2$, admits of ready access to the mixing and discharge chamber $D'$, and to the valves $v$, $v'$, and inlets $i$, $i'$, so that the parts may be quickly, conveniently and thoroughly cleansed to meet sanitary requirements,—a very important consideration when milk is the liquid to be dispensed.

The inlet $i'$, in the screw plug $I'$, through which the lower portion of the liquid contents of the reservoir D, is admitted to the mixing and discharge chamber $D'$, may be comparatively shallow and flush at top with the floor $d^3$, of the said receptacle D. The other screw plug I, formed with the inlet $i$, for the admission of the contents of the floatable drain duct F, to the said common mixing and discharge chamber $D'$, is formed with an upward extension of the side walls of the inlet $i$, which thus constitute a socket or recess for the reception of the lower flanged end $e'$, of the fulcrum-elbow $e$,—a lateral extension $e^2$, of which constitutes the trunnion upon which the lower end of the floatable drain duct F, is pivotally supported, as shown more particularly in Fig. 4, by reference to which and to Fig. 1, it will be seen that said lower end of the floating drain duct F, is formed with a cross sleeve or T $f$, which fits over said lateral extension $e^2$, of the fulcrum elbow $e$, and is held thereon by a cap screw $e^3$, engaging with the internally threaded end of the aforesaid lateral extension $e^2$, of the fulcrum elbow $e$. The lateral extension or trunnion $e^2$, is formed with a port $e^4$, of shape and area sufficient to maintain continuous communication between the lower end of the float-drain-duct F, and the inlet passage through the elbow $e$, to the inlet $i$, to the mixing and discharge chamber $D'$. It is to be noted in this connection that the lower end $e'$, of the fulcrum elbow $e$, simply fits snugly within the upper walls of said inlet $i$, so as to be readily detached therefrom by simply pulling the float-drain-duct F, upward,—thus freeing itself and the fulcrum elbow from engagement with the valve plate $D^2$. Furthermore, by the removal of the cap screw $e^3$, the fulcrum extension $e^2$, may be readily withdrawn from the cross T $f$, of the float-drain-duct F, so that all these parts and joints are rendered readily accessible and cleanable.

A float $f^2$, of any desired construction or configuration is attached to the floatable-drain-duct F, at or near its upper extremity in such manner as to maintain the mouth or inlet $f^3$, of the said duct F, slightly below the level of the liquid in the reservoir D. Hence, obviously the upper strata of liquid in the receptacle D, will always have access to said drain duct F, no matter what the height of the liquid level may be, nor how much it may vary, vertically considered, as related to the mixing and discharge chamber $D'$.

The float valves $v$, $v'$, may be identical in construction, and when the receptacle D, is wholly or partially filled with milk or other liquid obviously will be normally seated against the lower edges of the inlets $i$, $i'$. Under these conditions when the stop cock C, is opened it is apparent that the discharge flow of liquid from the mixing chamber $D'$, will draw open both valves $v$, $v'$, simultaneously, thereby replacing the outflow of liquid through the cock C, with the inflow through the inlet ports $i$, $i'$. Hence if milk is the liquid being dispensed, as we have presumed herein, the cream from near the top of the emulsion will be drained off in the same proportion as the heavier constituents descending through the inlet $i'$, opening directly into the bottom of the reservoir D. The float valves $v$, $v'$, or the equivalent thereof, are practically indispensable to the satisfactory operation of the apparatus in that they perform the important function of preventing the return of the cream and lighter constituents up through the ports $i$, $i'$, when the cock C, is closed and the downward flow ceases, thus retaining the equitable admixture of liquid constituents in the discharge chamber D, ready for immediate disposal when the cock C, is reopened. In this connection it is to be understood that by the term "valves" I herein mean to designate not only the float valves shown, but also any other mechanical expedients that will automatically check and prevent the return of the liquid contents of the mixing and discharge chamber $D'$, to the main receptacle D, above. Furthermore it will be seen that as compared with the apparatus disclosed in my Letters Patent hereinbefore referred to the main feature herein, in conjunction with the check valves $i$, $i'$, is the use of the floatable drain duct F, as a substitute for the plurality of fixed drain ducts of different heights claimed in said patent,—said plurality of fixed drain ducts while efficient for the purpose designed, involving considerable cost in the first place and the subsequent labor of keeping so many ducts, valves &c., clean and in sanitary condition. Hence, considering the floatable drain duct F, in the abstract, the essentials are the float $f^2$, for maintaining the mouth or inlet port $f^3$, just below the surface of the liquid level in the main reservoir D, and the conduit F, itself connecting said upper inlet or mouth $f^3$, with the lower valve-checked inlet $i$, into the mixing and discharge member D'; and it will be readily seen by reference to Figs. 8, and 9, that this duct F, may be modified in form and still perform the same function without departing from the spirit and intent of my invention in this respect. Thus in Fig. 8, the duct is shown as consisting of a rubber tube or conduit of any other suitable flexible material, while a like result is attained in Fig. 9, by making the tube telescopic,—the buoyant medium $f^2$, in either and all cases maintaining the desired and prescribed relation of the mouth $f^3$, of the duct F, with relation to the liquid level in the receptacle D. Thus as shown and described herein, by the use of only two inlets to the mixing chamber D', I am enabled to attain the desired result, while dispensing with a considerable number of drain tubes as compared with my patented construction of apparatus for the same purpose, although in this connection I wish it to be understood that more than two inlets to the mixing chamber D', may be provided, and more than one floatable drain duct used, if desired or found expedient, according to the size and capacity of the apparatus, or special requirements of use.

It is to be understood that by the term mixing and discharge chamber I herein mean to designate any means, interposed between the check valves $i$, $i'$, and the dispensing faucet C, whereby the flow from said valves is brought together prior to discharge.

What I claim as my invention and desire to secure by Letters Patent is,

1. Liquid dispensing apparatus of the character designated, comprising a main reservoir, a mixing chamber, a valve-controlled inlet interposed directly between the main reservoir and the mixing chamber, another valve-controlled inlet interposed between the main reservoir and the mixing chamber and connected with a floatable drain duct, said floatable drain duct provided with buoyant means for maintaining its mouth or inlet port below the liquid level in the main reservoir, and means for effecting the discharge of liquid from the mixing chamber, for the purpose described.

2. Liquid dispensing apparatus of the character designated, comprising a main reservoir, a mixing chamber, a plurality of alve-controlled inlets interposed between ne mixing chamber and the main reservoir, one or more of said inlets being each provided with a floatable drain duct, said floatable drain duct or ducts each provided with buoyant means for maintaining its mouth or inlet port below the liquid level in the main reservoir, and means for effecting the discharge of liquid from the said mixing chamber, for the purpose described.

3. In liquid dispensing apparatus of the character designated, the combination of a main reservoir, a mixing chamber, a removable valve plate interposed between the main reservoir and the mixing chamber, a plurality of valve-controlled ports in said removable valve plate, a floatable drain duct connected with one of said ports and provided with buoyant means for maintaining its mouth or inlet below the liquid level in the main reservoir, and means for effecting the discharge of liquid from said mixing chamber, for the purpose described.

4. In liquid dispensing apparatus of the character designated, the combination of a main reservoir, a mixing chamber, a movable valve plate interposed between the main reservoir and said mixing chamber, a plurality of detachable inlet valve seats mounted in said valve plate, valves arranged to automatically yield to the flow of liquid from the main reservoir to the mixing chamber, and to automatically close upon the said inlet valve seats when the flow ceases, a floatable drain duct communicating with one of said inlet valve seats and provided with buoyant means for maintaining its inlet mouth below the level of liquid in the main reservoir, and means for effecting the discharge of liquid from the mixing chamber, for the purpose described.

5. In liquid dispensing apparatus of the character designated, the combination of a main reservoir, a mixing chamber, a removable valve plate interposed between the main reservoir and the mixing chamber, a plurality of valve-controlled ports in said removable valve plate, a floatable drain duct detachably connected with one of said ports and provided with buoyant means for maintaining its mouth or inlet below the liquid level in the main reservoir, and means for effecting the discharge of liquid from said mixing chamber, for the purpose described.

6. In liquid dispensing apparatus of the character designated, the combination of a main reservoir, a mixing chamber, a plurality of valve-controlled inlet ports interposed between the mixing chamber and the main reservoir, a hollow fulcrum elbow detachably fitting over one of said ports and formed with an inlet, a floatable drain duct the lower end of which is pivotally and detachably supported upon said fulcrum elbow and the upper end of which is formed with buoyant means for maintaining its inlet or mouth slightly below the level of liquid in the main reservoir, and means for effecting the discharge of liquid from the mixing chamber, for the purpose described.

7. In liquid dispensing apparatus of the character designated, the combination of a reservoir, a floatable drain duct provided with buoyant means for maintaining its mouth or inlet port below the liquid level in said reservoir, a valve interposed between the lower end of said floatable drain duct and a channel communicating with means for dispensing the liquid, a discharge port arranged to take liquid from the lower portion of the reservoir, and a valve interposed between said discharge port and said means for dispensing the liquid, for the purpose described.

HARRY C. LYONS.

Witnesses:
 DOROTHY MIATT,
 GEO. WM. MIATT.